United States Patent Office 3,298,473
Patented Jan. 17, 1967

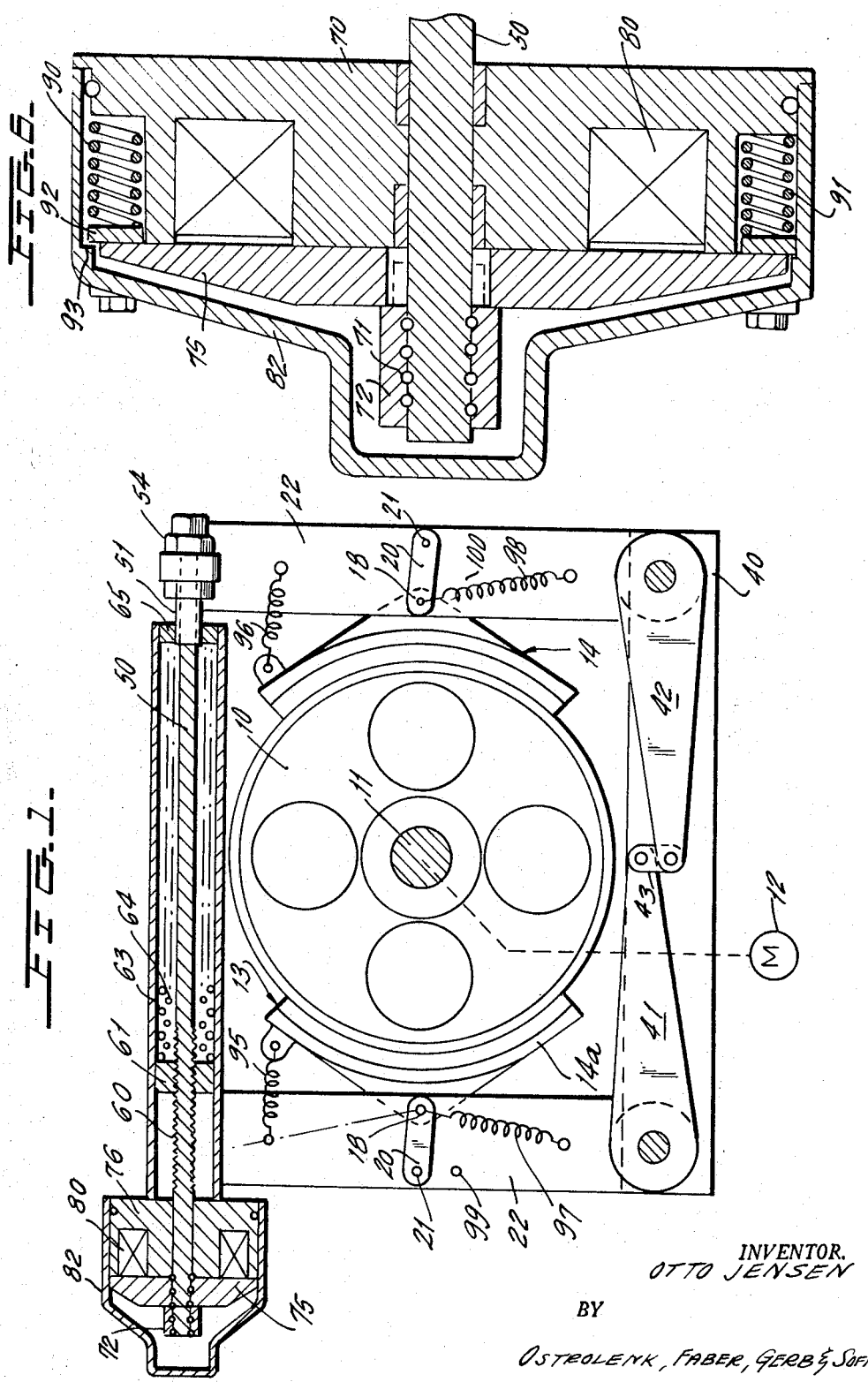

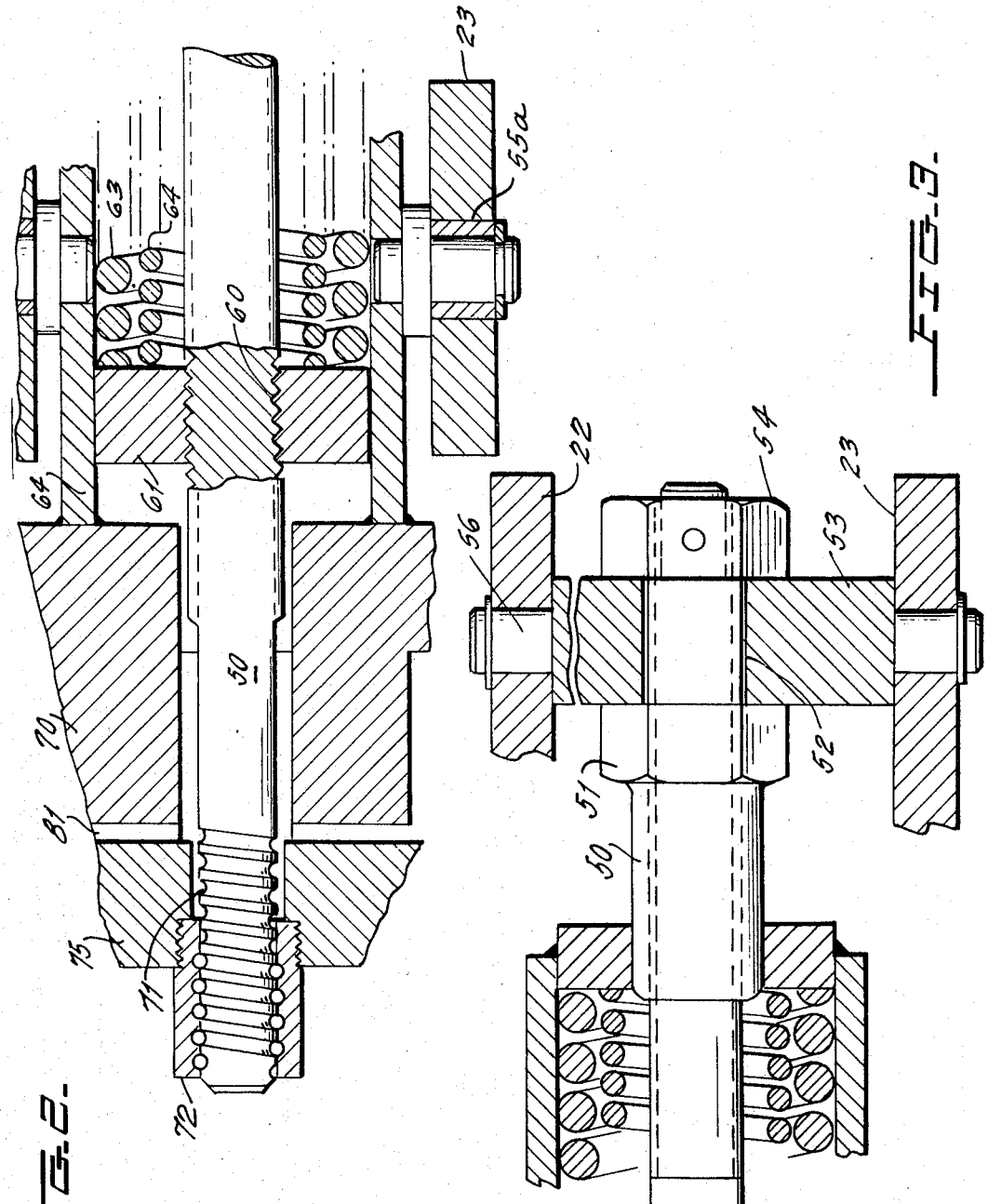

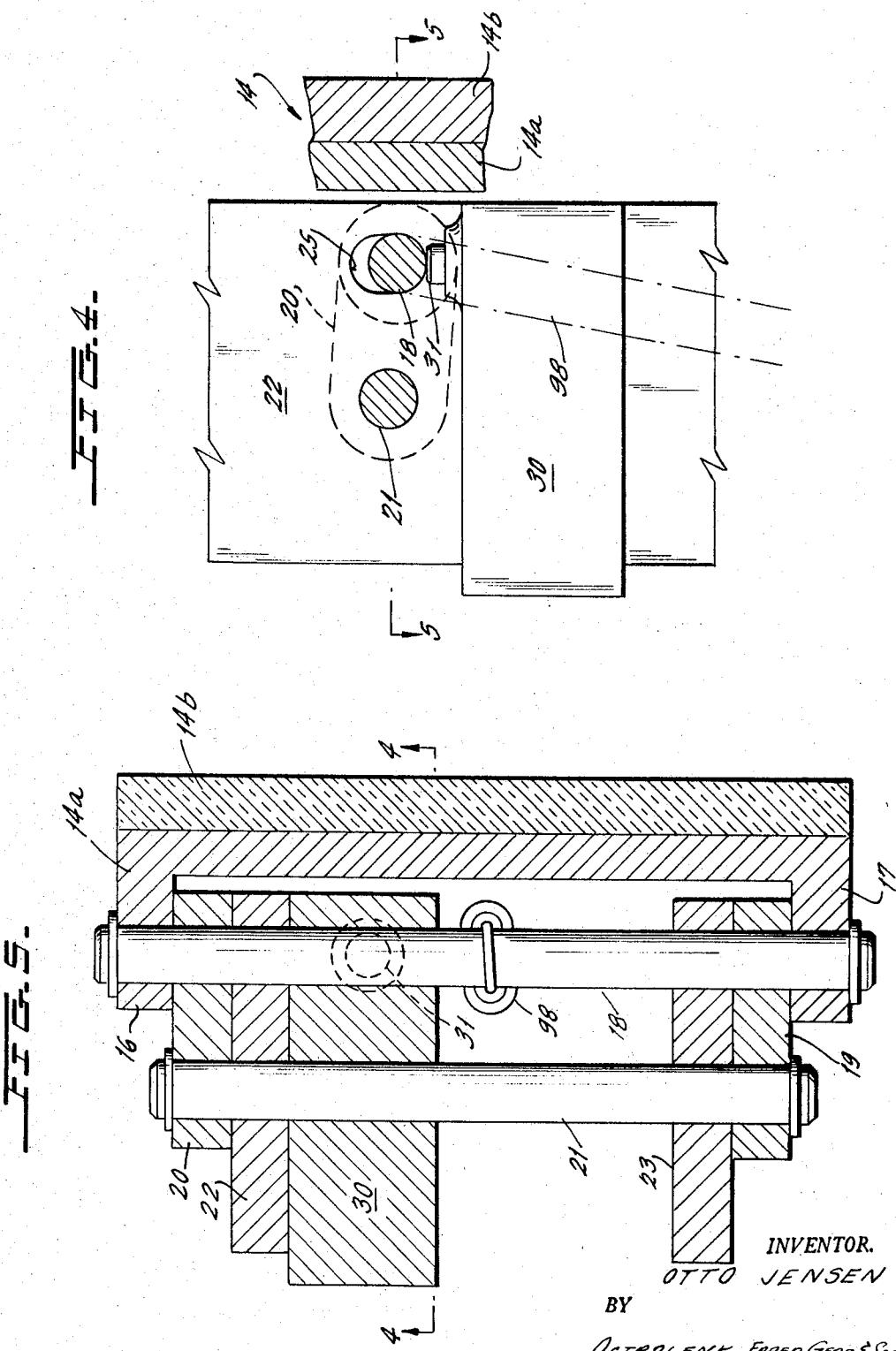

3,298,473
AUTOMATIC AIR GAP ADJUSTMENT FOR SPRING BRAKE
Otto Jensen, Malvern, Pa., assignor to I-T-E Circuit Breaker Company, Philadelphia, Pa., a corporation of Pennsylvania
Filed Apr. 8, 1966, Ser. No. 541,183
4 Claims. (Cl. 188—171)

This invention relates to a brake particularly for use in hoist systems, and more particularly relates to a novel brake for hoist systems which provide continuous adjustment of the air gap of a release magnet to compensate for brake shoe lining wear, and wherein the release of the brake is possible only when the hoist motor provides sufficient torque for moving a load upwardly.

Mechanical brakes for hoists are well known in the art, and comprise conventional brake shoes cooperating with conventional brake drums where the brake drum is connected to the output shaft of a hoist motor. Conventionally, a pair of biasing springs will bias the brake shoes toward an engaged position with the brake drum, with a magnetic release system provided, whereby energization of a winding will attract an armature connected to the spring biasing system to slightly release the spring and permit the brake shoes to release from the brake drum, thereby permitting rotation of the output shaft of the hoist motor.

There are two inherent problems in this general type of system. The first problem is the possibility of attempting to hoist the load when insufficient torque is available at the motor output to cause the hoisting operation so that there will be an unintentional drop of the load. That is to say, the operator may have a load on the hoist which applies some predetermined load to the hoist. So long as the brake is engaged, the load remains fixed in position. If the operator now moves the hoist controller to a particular position which would supply an insufficient torque at the output shaft of the motor to overcome the load, he will also automatically release the magnetic system to release the brake shoes, but the load will now drop instead of rise as expected by the operator.

One manner in which this problem has been overcome is illustrated in U.S. Patent 3,158,233 to Heberlein, assigned to the assignee of the present invention, wherein the compression force on the brake shoes is carried within a slot in a brake shoe link so that if there is a downward movement of the load when the controller calls for an upward movement, a switch means will be operated to prevent the release of the brake. With this type arrangement, however, the compression forces on the shoes must be supported along the length of a slot within the link, which is an undesirable mechanical condition which can lead to wear within the slot.

In accordance with the present invention, a novel linkage is provided whereby compression forces on the brake shoes are contained within a standard pivot connection, while the other end of the link is connected to the brake shoe arm within a slot therein having limited motion. A shaft extending from the pivotal link moves within the slot to operate a microswitch within the controller circuit, whereby, if the load on the motor output shaft is greater than the torque applied to the motor, the link remains in a lower position and holds a switch open to prevent the energization of the release magnet of the brake.

A second problem which occurs in the operation of the general type of magnetically released spring-set brake of the invention exists in the wear of the brake lining during operation of the system. The length of the air gap in the release magnet will be related to the distance travelled by the brake shoes. Thus, when the magnet is deenergized, the shoes will move in toward the wheel and the magnet armature will move outwardly. As the brake lining wears, the shoes will move further in so that the air gap between the magnet and the armature increases.

Because of a standard lever arm relationship used in such brakes, this condition is aggravated since the armature travel is normally about four times the brake shoe travel. Thus, a brake lining wear of only ⅛ inch on each shoe would increase the air gap between the release magnet and its armature by about ½ inch. The magnet system must then be designed to provide adequate pull at the largest possible air gap resulting from normal brake lining wear so that conventionally, a very large and oversized magnet is needed.

In accordance with the present invention, the air gap between the armature and the magnet structure is constantly and automatically adjusted to be maintained at some predetermined value, whereby a substantially smaller release magnet can be used in the system.

More particularly, the magnet armature is mounted on a ball-bearing nut threaded on the end of the brake release rod. Thus, frictional forces between the nut and the screw thread on the rod is negligible so that the armature is free to rotate when it is attracted toward its magnet which is stationarily positioned. When the magnet is energized, the armature is then rotated to reduce the air gap with the armature meeting a frictional stop position located to produce the fixed required air gap. Thus, continued pull on the armature beyond this point will cause it to move without rotation toward its fixed air gap position pulling the brake release rod along with it. Therefore, a fixed air gap will be maintained, regardless of brake lining wear, since the position of the armature with respect to the operating shaft connected to the brake shoe arms will be continually adjusted by rotation of the armature until it meets the rotational prevention friction members.

Accordingly, a primary object of this invention is to provide a novel self-adjusting load-responsive brake.

Another object of this invention is to provide a novel brake which includes switch means therein for indicating when the operating torque on an output shaft due to a load is overcome by the torque of a motor driving the shaft in an opposite direction.

Another object of this invention is to provide a novel self-adjusting brake system which can use a relatively small release magnet.

A still further object of this invention is to provide a novel magnetic system for brakes for hoist systems which has a fixed air gap regardless of brake lining wear.

These and other objects of this invention will become apparent from the following description when taken in connection with the drawings, in which:

FIGURE 1 is a side plan view, partially in cross-section, of the brake system of the present invention.

FIGURE 2 is an enlarged plan view, partially in section, showing the manner in which the spring shaft is connected to the release magnet.

FIGURE 3 is a plan view, partially in section, illustrating the details of the manner in which the spring shaft is connected to the right-hand operating arm in FIGURE 1.

FIGURE 4 is a cross-sectional view of FIGURE 5 across line 4—4 in FIGURE 5 and shows the load-responsive link connected between the brake shoe and the brake shoe arm of FIGURE 1.

FIGURE 5 is a cross-sectional view of FIGURE 4 taken along the line 5—5 of FIGURE 4.

FIGURE 6 is an enlarged cross-sectional view of the release magnet structure.

Referring first to FIGURE 1, there is illustrated therein a standard brake drum 10 which is connected to an output shaft 11 of a hoist motor 12. The brake drum 10 is rotatable about the axis of shaft 11, and receives brake shoes 13 and 14 which are positioned on opposite sides of the drum and which are movable into engagement with the drum in order to brake the rotation of shaft 11.

A portion of brake shoe 14 is illustrated in FIGURES 4 and 5 where it is seen that the shoe is comprised of a metallic body 14a which has an interior brake lining 14b in the usual manner. The main body 14a of the shoe then has extending ears 16 and 17 which are pivotally connected by a pivot pin 18 to load-responsive links 19 and 20. The opposite end of load-responsive link 20 is then provided with a pivotal shaft 21 which extends directly through brake arms 22 and 23, thereby to directly pivotally mount links 19 and 20 on the arms 22 and 23.

It is to be noted that the shaft 18 extends through short slots in arms 22 and 23, best shown in FIGURE 4 as the slot 25 in arm 22. The slot 25 which receives the shaft 18 then permits a limited rotational movement of the load-responsive links 19 and 20, although a direct mechanical connection is made from the brake shoe 14 to the arms 22 and 23 through the direct pivotal connection of shaft 21 to the arms 22 and 23 and links 19 and 20. That is to say, the mechanical transmission of force from the arms 22 and 23 to the brake shoes 14 will not be along the surface of a slot as in the case of U.S. Patent 3,158,233, but will occur from the direct pivotal connection of shaft 21 in arms 22 and 23.

A microswitch 30 is then mounted directly on the inside of arm 22, as shown in FIGURES 4 and 5, which has an extending contact 31 which receives shaft 18 when shaft 18 moves to its lowest position.

In order to energize the brake coil of the brake magnet and as will be described more fully hereinafter, it is necessary to close switch 30 by causing the upward movement of shaft 18. That is to say, and as described in U.S. Patent 3,158,233, before the brake release can be operated, and assuming that the hoist load attached to shaft 11 of FIGURE 1 tends to rotate drum 10 in a clockwise direction, while the motor torque to lift the load would rotate shaft 11 in a counterclockwise direction, it is necessary that the motor initially rotate drum 10 by a sufficient distance, as limited by slot 25 which receives the load-responsive link 20, to move shaft 18 upwardly along with the brake shoe before the brake shoes 14 can be released. This operation insures that a sufficient upwardly directed motor torque is available before the brake is released.

The lower ends of brake shoe arms 22 and 23 are then pivotally mounted to a suitable support base 40, shown in FIGURE 1, which could incorporate a suitable shoe motion equalizer comprising links 41, 42 and 43 which are connected in the usual manner.

The upper ends of arms 22 and 23 are then connected to a spring biasing assembly which includes a shaft 50 which is directly secured to the right-hand arms 22 and 23, as shown in FIGURE 3. Thus, in FIGURE 3, the shaft 50 has a threaded right-hand end which extends through an elongated nut 51. The end of shaft 50 extends beyond the right-hand surface of nut 51 and through a central opening 52 in connecting member 53, and beyond connecting member 53 to receive a capturing nut 54. The capturing nut 54 then locks member 53 onto the end of shaft 50 and has pivot members 55 and 56 extending therefrom which are pivotally connected in arms 23 and 22, respectively.

In a similar manner, the left-hand arms 22 and 23 in FIGURE 1 are pivotally connected to housing 66 as by pivotal connections 55a, shown in FIGURE 2.

Toward the left-hand end of shaft 50 is a threaded region 60 which receives an adjustable spring rest nut 61, best shown in FIGURE 2, which receives one end of concentric compression springs 63 and 64. The other end of springs 63 and 64 bear against member 65 (FIGURES 1 and 3) which is slidably fitted over the exterior of nut 50 and is welded to one end of the spring housing 66. Therefore, the springs 63 and 64 will exert a biasing force on nut 61, and thus shaft 50, which is threaded thereto, tending to move the shaft 50 to the left in FIGURE 1. The other end of housing 66 is then welded to the magnet body 70 (best shown in FIGURES 1 and 2) which serves as a fixed support for the left-hand end of housing 66.

The left-hand end of shaft 50 then extends beyond the end of housing 66 and is terminated in a thread 71 which is of the type to receive ball bearings and a ball nut of any standard well known type. A ball nut 72 is then captured on the left-hand end of shaft 50, as shown in FIGURES 1, 2 and 6, and is threaded into the armature 75 of the release magnet, thereby to rigidly connect ball nut 72 to armature 75. Thus, both the ball nut 72 and armature 75 are freely rotatable on the thread 71 of shaft 50.

The magnet body 70 then contains a suitable energizing winding 80 which can be energized from any suitable source of control voltage to create a flux which circulates through the normal air gap 81 (FIGURE 2) to attract the armature 71, which is of magnetic material, toward the magnet body 70. An aluminum dust-tight housing 82 encloses the complete magnetic system, as illustrated.

The details of the magnetic release system, which is made in accordance with the invention, is best shown in FIGURE 6. Referring now to FIGURE 6, it is seen that the magnet body 80 further has cavities therein which receive compression springs such as springs 90 and 91 which bias a friction disk 92 upwardly. The motion of friction disk 92 from a position flush with the upper surface of magnet body 70 to an upper position defined by shoulder 93 in housing 82 constitutes the fixed air gap that will exist between the armature and the magnet body. That is to say, the armature of FIGURE 6 is shown in the sealed position where the coil 80 is energized. When the coil is deenergized, the armature 75 can move to the left to its full open position, while the friction disk will move along with armature 75 until it reaches shoulder 93 and is held in that position.

If now there has been brake wear and the armature position 75 has moved upwardly to some arbitrary position, after a subsequent energization of coil 80, the magnetic force between armature 75 and magnet body 70 will cause the armature initially to rotate on the end of shaft 50, since a very low friction-connection is created between the ball nut 72 carrying armature 75 and the shaft 50.

As soon as armature 75 reaches the top of friction disk 92, however, the armature rotation will cease with the armature 75 and magnet body 70, spaced by the fixed armature opening defined by the axial distance from the surface of magnet body 70 to shoulder 93, whereupon continued attraction of the armature 75 will cause it to move shaft 50 downwardly in FIGURE 6, thereby to operate the brake in a manner to be described.

The essential concept in FIGURE 6, however, is that, during the time in which the magnetic release system is operating against the spring force of the spring set system, the armature will be spaced from the magnet body by a fixed armature opening position, regardless of any brake lining wear.

In operation, and assuming that winding 80 is deenergized, the spring force of springs 63 and 64 will tend to move shaft 50 to the left in FIGURE 1 and housing 66 to the right in FIGURE 1. Therefore, the two brake shoes 14 on either side of drum 10 will be biased into engagement with the drum 11 so that the brake will normally be applied.

In order to release the brake, suitable circuitry is provided which may be of the type shown in the aforementioned U.S. Patent 3,158,233, so that hoist control power is initially applied to motor 12, thereby to cause shaft 11 to rotate in a direction opposed to the load applied to the shaft by the load which is to be lifted.

The circuit is so designed, however, that magnet winding 80 cannot be energized until the microswitch 30 is operated, thereby requiring that the motor torque rotate shaft 11 against the force of the load to be lifted by a sufficient distance determined by the length of slots 25, shown in FIGURE 4. At this time, the coil 80 can be energized in order to release the brake, since it is now assured that the load can be lifted upwardly when the brake is released, and an inadvertent drop of the load cannot occur.

Once the coil 80 is energized, the armature 75 will then be attracted toward magnet body 70. Once armature 75 engages friction disk 92 which is located within shoulder 93 because of the biasing springs 90 and 91, any rotation of armature 75 due to possible brake lining wear will cease, and the armature will thereafter move without rotation into engagement with magnet body 70, thereby to move shaft 50 downwardly in FIGURE 6 and to the right in FIGURE 1. Note that there will be a continuous adjustment for brake lining wear each time the magnet system is energized.

The right-hand movement of shaft 50 will thereby cause the arms connected to brake shoes 14 to move away from one another, thereby to release the brake on drum 10 to permit the free rotation of shaft 11 under the influence of motor 12.

In order to prevent tilting of the brake shoes 14 when the brake is released, it is desirable to also provide counterbalancing springs for the brake shoes shown in FIGURE 1 as springs 95 and 96 as well as biasing springs 97 and 98 which bias links 19 and 20 downwardly toward stops 99 and 100, as shown in FIGURES 1, 4 and 5.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. An automatic air gap adjustment structure for a magnetically operated system; said system including a stationary magnet structure; an armature movable with respect to said stationary magnet structure responsive to energization of said magnet between a sealing position and an open position; the distance between said armature and said magnet structure in said open position defining an air gap; a shaft connected to a load to be moved by said armature; and connection means connecting said shaft to said armature; said connection means including a low friction threaded connection between said armature and said shaft whereby said armature is freely rotatable on said shaft; a rotation prevention means stationarily positioned with respect to said armature; said rotation prevention means engaging said armature for preventing rotation of said armature with respect to said shaft when said armature is spaced a predetermined distance from said stationary magnet structure whereby said armature rotation on said shaft is responsive to energization of said magnet structure until said armature engages said rotation prevention means, and is thereafter attracted toward said magnet structure without rotation to move said load through said predetermined distance.

2. The device as set forth in claim 1 wherein said load is a brake biased to the braking position when said magnet is deenergized.

3. The device as set forth in claim 1 wherein said connection means includes ball bearings captured in said threaded connection.

4. The device as set forth in claim 1 wherein said rotation prevention means includes pressure plate means adjacent the surface of said magnet structure facing said armature, biasing means connected to said pressure plate means for biasing said pressure plate means toward said armature and stop means for limiting the outward extension of said pressure plate means beyond the surface of said magnet structure.

References Cited by the Examiner

UNITED STATES PATENTS 2,702,101    2/1955    Dewhurst _____ 188—171

MILTON BUCHLER, *Primary Examiner.*

B. S. MOWRY, *Assistant Examiner.*